UNITED STATES PATENT OFFICE.

HENRI TERRISSE, OF VERNIER, NEAR GENEVA, SWITZERLAND, ASSIGNOR TO THE SOCIÉTÉ ANONYME DE LA THYOLEINE, OF VERNIER, NEAR GENEVA, SWITZERLAND.

INSECTICIDE.

No. 901,268.      Specification of Letters Patent.      Patented Oct. 13, 1908.

Application filed August 7, 1906. Serial No. 329,599.

*To all whom it may concern:*

Be it known that I, HENRI TERRISSE, chemist, citizen of Switzerland, residing at Vernier, near Geneva, in the Canton of Geneva and the Confederation of Switzerland, have invented certain new and useful Improvements in Insecticides, of which the following is a specification.

The different hydrocarbons, petroleum, benzin, benzene, light and heavy tar-oils and the like, and certain nitro-derivatives are used as insecticide substances (*vide* Hollrung, *Handbuch der Chemischen Mittel Gegen Pflanzenkrankheiten*, Berlin, 1898, page 142 and following). These substances are efficacious but their use is dangerous. The main disadvantage consists in their insolubility in water, and it is therefore necessary to use soap for manufacturing suitable mixtures, the soap acting principally as an emulsifying substance. If the emulsion is not perfect as happens often, parts of the plants are injured, especially the young shoots, which are in contact with the hydrocarbon (petroleum or the like) in its oily and not emulsified state (*vide* Larbalétrier, *Essais Pratiques de Chimie Horticole*, Paris, 1898, page 114.

Besides hydrocarbons emulsified by means of soap, mixtures of phenols, cresols, naphthols and the like with soap are employed as parasiticide substances. These substances exert at least the same action as those named above, but are less dangerous, without however accomplishing efficaciously their object. (*Vide* Larbalétrier, *Essais Pratiques de Chimie Horticole*, Paris, 1898, page 118 and following).

Now it has been found that the sulfonic acids and the sulfones (so called ichthyol sulfonic acids) which are used in therapeutics and which are obtained by the action of sulfuric acid upon mineral oils containing chemically combined sulfur serve efficaciously under some circumstances also as a remedy for noxious insects, cryptogamic illnesses of plants etc. After a series of experiments made for that object, it has been found, that the action of pure ichthyol-sulfonic acids, is a very slow one and especially, that the plants are easily injured owing to the too strong concentrations which are necessary for the destruction of the parasites. But if the ichthyol-sulfonic acids or their salts (sodium, potassium-salt etc.) are mixed in a certain proportion with soda soap or potash soap, pasty masses are obtained, which diluted with water (best a dilution of 1% to 2%) do not injure even the most delicate plants but form an excellent remedy for destroying noxious insects, germs etc. This mixture is made preferably by using the following proportions: 0.5 part ichthyol, with 1 part soap, 1 part ichthyol, with 1 part soap, 1.5 part ichthyol, with 1 part soap. Quantities being between these limits can be also employed. The ichthyol may be in the acid form or in that of a salt of the acid, as ichthyolsulfonate of sodium, potassium, ammonium or the like alkaline metal. These pasty masses can be made for example as follows: 10 kilograms ichthyolsulfonic acid, 3 kilograms glycerin, 10 kilograms black potash soap are mixed during 30 minutes on the water-bath in a shaking-device until the mass forms a homogeneous paste. This pasty mass is completely and in all proportions soluble in water.

If instead of sulfonic acids their salts are used, the mass is made in the same manner as described above.

Having thus fully described my invention I claim:

An insecticide consisting of ten (10) parts of ichthyol sulfonic acid, three (3) parts of glycerin and ten (10) parts of soap.

In testimony whereof I have affixed my signature in presence of two witnesses.

HENRI TERRISSE.

Witnesses:
- L. H. MUNIER,
- R. DE WURSTEMBERGER.